May 1, 1962   J. F. BACON ET AL   3,032,659
SCINTILLATOR
Filed Sept. 4, 1958
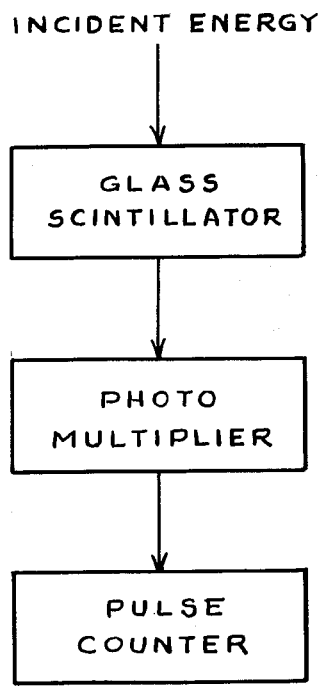
INVENTORS
JAMES F. BACON,
THOMAS H. ELMER
AND HARRISON P. HOOD
BY Clarence R. Patty, Jr.
ATTORNEY

3,032,659
SCINTILLATOR

James F. Bacon, Reading, Mass., and Thomas H. Elmer, Painted Post, and Harrison P. Hood, Corning, N.Y., assignors to Corning Glass Works, Corning, N.Y., a corporation of New York
Filed Sept. 4, 1958, Ser. No. 758,906
7 Claims. (Cl. 250—71.5)

This invention relates to scintillation counters and more particularly to a novel scintillating element, or scintillator, for use in such a counter.

A scintillation counter consists essentially of a scintillator and a photo-multiplier. The latter is a type of photo tube designed to detect and convert low intensity light pulses, commonly referred to as scintillations, into recordable electrical pulses. Usually a counter also includes some means for recording the electrical pulses thus produced. A scintillator is a body of material capable of being activated by high energy particles or quanta to emit a brief pulse or flash of light, that is, a scintillation. Effective activating quanta include any that are more energetic, that is have a higher energy level, than those that characterize normally visible light. This will include, for example, X-rays, U.V. rays and cathode rays.

The phenomenon of scintillation was recognized early in the study of radioactive materials and was widely used as a visual means of determining the nature and properties of such materials. This visual method was largely abandoned with the development of the Geiger counter, gas ionization chamber, and other radiation responsive recording devices. The recently developed scintillation counter eliminates the need for visual counting of scintillations. As such it provides a radiation recording device much more flexible than those previously used for such purposes as mineral and oil prospecting, oil well logging, and radiation detection in conjunction with fissionable material use.

Scintillators heretofore known and available have been produced from crystals or certain types of solutions. Inorganic single crystals, such as silver activated zinc sulfide and thallium activated sodium iodide, have been widely used. However, such crystals are difficult to grow, and scintillators of this type have been restricted in size and extremely expensive. Organic single crystals, such as anthracene and naphthalene, may also be used, as can finely divided crysals, such as zinc sulfide, embedded in a plastic carrier. However, scintillators of this nature have a very low absorbing or stopping power for the types of radiation to be detected. Furthermore, a scintillator must be highly transparent to its own fluorescence or light emission. Certain solutions also have the ability to scintillate. However, they present an obvious problem of handling and storage and are not adapted to use under variable conditions of temperature and pressure.

These undesirable characteristics have seriously limited the areas in which prior types of scintillators and scintillating equipment could be used successfully. As a result, there has persisted a distinct and recognized need for a more versatile and less expensive type of scintillator. It is a primary purpose of the present invention to provide a scintillator that meets this need and that is relatively free from the inherent limitations of prior types.

Our invention resides in a scintillator formed from a silica base glass having cerium oxide incorporated therein, and in a scintillation counter comprising such a cerium oxide containing, glass scintillator and a photomultiplier to convert into electrical pulses scintillations emitted therefrom.

The accompanying drawing illustrates, in block form, the arrangement of components in such a scintillation detection and counting system. As illustrated, radiant energy is incident on a glass scintillator responsive to such energy; the resulting scintillations are received and converted to electrical pulses by a photomultiplier; these pulses are, in turn, received by a pulse counter, a conventional output measuring instrument.

Virtually all glasses scintillate to some extent under the influence of high energy radiation. Normally, however, the scintillations produced are inadequate for a practical, commercial scintillator. Either the actual number of scintillations is too small, or, alternatively, the light pulse intensity is so low as to be lost in the background noise of the usual photomultiplier tube. Our invention is based on the discoveries that the number of useful scintillations emitted by a silica base glass, that is scintillations having an adequate intensity for detection purposes, is increased many-fold by the presence of cerium oxide in such glass; and that such increase is of sufficient magnitude to make such glasses potentially useful in the production of scintillators.

For present purposes cerium oxide may be effectively introduced into a silica-base glass, that is a glass containing $SiO_2$ as a primary glass forming component, either by conventional melting practice or by impregnation of a leached, porous glass body. In the first method, a compatible cerium compound is mixed with proper proportions of other glass making materials to form a glass batch which is then melted in accordance with known practice to form a glass from which a scintillator of desired shape may be formed.

In the latter method, a procedure described in United States Patent No. 2,303,756, issued to M. E. Nordberg and H. R. Rumenapp, is employed. Briefly, this procedure involves melting a selected borosilicate glass, forming a glass body from such glass, separating the glass into two phases by heat treatment, dissolving one of the glass phases in acid to produce a porous glass body, immersing the porous body in a solution of impregnating salt and thereafter drying and firing the impregnated glass body to consolidate it into a non-porous body of corresponding shape. The production of leached, porous glass bodies and their consolidation is also described in United States Patent No. 2,106,744 to Hood et al., referred to in the Nordberg et al. patent.

Glasses produced by the leaching and consolidation process of the Nordberg et al. patent and the earlier Hood et al. patent are known in the glass art as 96% silica glasses and will be so designated here. This is a general designation for high silica glasses produced in a characteristic manner and does not indicate the precise silica content. In general such glasses, exclusive of any oxide introduced by impregnation, contain at least 94% $SiO_2$ and minor amounts of $B_2O_3$, $Al_2O_3$ and $Na_2O$.

In accordance with our invention, a leached, porous, glass body is impregnated with a cerium salt solution. An acid or aqueous solution of any soluble cerous or ceric salt, capable of conversion to the oxide form, may be employed for impregnation. For example, solutions of nitrates, oxalates, sulphates or chlorides may be employed. The time required for complete impregnation of a porous glass body will depend on the body dimensions and also on solution viscosity. By way of example, a 4 millimeter thick, porous plate is completely impregnated with a dilute nitric acid solution of cerium nitrate in about ten minutes.

The amount of cerium oxide introduced into, and present in, the final consolidated glass varies with the concentration of cerium compound in the impregnating solution. We have found that about 0.3% cerium oxide, calculated as cerium, is the optimum amount to introduce into a glass by this method for scintillation purposes. Larger amounts tend to produce a larger number of scintillations, but also tend to produce an opal, or opalescent, condition in the glass. Scintillations within such a glass body are absorbed and only those produced on the glass surface are usefully emitted. It is then generally desirable to avoid, either in the impregnating solution or the base glass, materials capable of producing an opalescent condition in the glass.

The striking effect achieved by incorporating even a minute amount of a cerium compound, as well as the effect of color and opal formation, may be seen in the table below. A series of eleven consolidated glass samples were prepared. Scintillation counts per minute were measured on each, as well as on a standard reference sample, to permit comparison with other data presented subsequently. The samples were prepared by impregnation with 0.5 N nitric acid solutions containing amounts of $Ce(NO_3)_3 \cdot 6H_2O$ varying from 0 to 30 grams per 50 ml. of solution to vary the cerium oxide in the consolidated glass samples. Cerium oxide content, calculated as cerium, is shown for each sample along with the adjusted scintillation counts and physical appearance of the samples.

| Sample | Percent Ce | Counts/Minute in Thousands | Appearance |
| --- | --- | --- | --- |
| 0 | | 0.2 | Colorless. |
| 1 | 0.01 | 4.8 | Do. |
| 2 | 0.07 | 105 | Do. |
| 3 | 0.13 | 143 | Do. |
| 4 | 0.3 | 139 | Faint yellow. |
| 5 | 0.4 | 116 | Light yellow |
| 6 | 0.9 | 62 | Cloudy brown. |
| 7 | 1.4 | 61 | Opaque. |
| 8 | 2.1 | 38 | Do. |
| 9 | 2.8 | 18 | Dense opal. |
| 10 | 3.8 | 12 | Very dense opal. |

In the consolidation step, the impregnated porous glass is converted to a non-porous body. Simultaneously, the cerium salt is converted to the oxide and incorporated within the resulting non-porous glass body to impart scintillation properties. This step is conducted in accordance with conventional practice except that it is preferably conducted in an oxygen atmosphere. For example, the impregnated glass body is rinsed and dried, then heated in air to 900° C. At this temperature the atmosphere is changed to substantially pure oxygen and the glass heated to a temperature on the order of 1225°–1275° C. in about an hour and held for an additional ten minutes or so to complete consolidation. The advantage of firing in a stream of flowing oxygen may be seen from comparative scintillation counts on three glass scintillators prepared in identical fashion except that each was fired in a different consolidating atmosphere. The atmospheres were hydrogen, air and oxygen; the respective counts in scintillations per minute were 25,000 43,000 and 69,000.

We have also found that additional firing of a scintillator, after consolidation and at temperatures above the consolidation temperature, tends to improve the scintillator when it has been consolidated in oxygen but not when treated in hydrogen. Thus, a scintillator consolidated in oxygen at 1230° C. showed a count of 112,000 scintillations per minute. After a further heat treatment at 1400° C. in air for a half hour the count was 198,000 scintillations. No completely satisfactory explanation for this behavior is known. It is suggested, however, that an oxygen atmosphere is required during consolidation to avoid undue reduction of the cerium ions; but that some reduction is desirable for optimum scintillation and this is achieved during subsequent heat treatment of the consolidated glass body.

As pointed out earlier, scintillators in accordance with the present invention may also be formed from glasses prepared by conventional melting practice. Such glasses will contain $SiO_2$ as the primary glass-forming oxide, that is will be silica base, or silicate type, glasses. In addition, they will contain cerium oxide as the scintillating agent and at least one glass modifier, or fluxing agent for the silica. The alkali metal oxides may be used interchangeably in known manner for glass forming or flux purposes and the total $R_2O$ content may be on the order of 5–25%. $B_2O_3$ may also be present for flux purposes in amounts up to about 20%; larger amounts are detrimental to scintillation characteristics of a glass. $B_2O_3$ is particularly desirable when $K_2O$ is the major or sole alkali metal oxide.

The presence of BaO in amounts up to about 15% enhances the scintillation properties of cerium-containing, silicate glasses, possibly due to an influence on the state of oxidation of the cerium oxide. Other alkaline earth metal oxides such as CaO and MgO are less effective, but may be present if desired. $Al_2O_3$ may also be present for purposes of glass stability. Oxides of lead, manganese, chromium, zinc, zirconium, iron and titanium appear to have a detrimental effect on scintillation and desirably are avoided insofar as practical. Sulphur is particularly detrimental and the use of sulphides or sulphates as batch materials should therefore be avoided.

Any compatible cerium compound may be employed as the source of cerium oxide. In general, we prefer to have about 2% by weight of cerium oxide in the glass. However, larger amounts may be present, and smaller amounts are effective although to a lesser degree.

By way of further illustrating optimum scintillating glasses for the purposes of the present invention, the following glass compositions are given in percent by weight as calculated from the glass batch together with comparative scintillation counts in thousands per minute with a cerium 137 isotope as a radiation source.

| | 1 | 2 | 3 | 4 | 5 | 6 |
| --- | --- | --- | --- | --- | --- | --- |
| $SiO_2$ | 73 | 73 | 73 | 69 | 73 | 73 |
| $B_2O_3$ | 13 | 13 | 13 | 13 | 8 | 13 |
| $Al_2O_3$ | | | | 4 | | 5 |
| BaO | 5 | 5 | 5 | 5 | 10 | |
| $K_2O$ | 7 | | | 7 | | |
| $Na_2O$ | | 7 | 7 | | 7 | 7 |
| $CeO_2$ | 2 | 2 | 3 | 2 | 2 | 2 |
| Count | 125 | 175 | 162 | 132 | 105 | 132 |

Each of the above glasses was melted from a batch containing an amount of sugar equivalent to 0.2% of the glass since we have found it desirable, in producing scintillators from melted glasses, to insure mild reducing conditions. Surprisingly however, if reduction is carried too far, the scintillation count is depressed. Thus, over about one percent sugar, or use of stronger reducing means, have proven undesirable.

It is our belief, based on the evidence presented, that the cerium oxide content of a glass scintillator, whether produced by melting, or impregnating and consolidation, should be in an intermediate or partial state or reduction for optimum scintillating effects. In other words, glass making materials and/or glass making conditions which strongly favor formation of either ceric cerous ions to the exclusion of the other do not result in optimum glass scintillators. The nature of the scintillation mechanism in glass cannot be precisely stated, but it does appear that a balanced condition between ceric ($Ce^{+4}$) and cerous ($Ce^{+3}$) ions favor the energy transfer mechanism that causes scintillation to occur. Such an equilibrium or balanced ion state of oxidation is meant where the term "intermediate state of oxidation" is used in this application. While the optimum ratio may vary somewhat in different glasses and hence cannot be precisely stated, optimum production conditions can readily be determined for any particular glass by using the information set forth above as a guide.

By way of indicating the unique nature of the present glass scintillators, it may be noted that counts on the order of 100,000 or more per minute are obtained through exposure to a standard radiation source. With ordinary commercial glasses of various types, counts on the order of a hundred per minute were observed.

By way of illustrating the production of a consilidated glass scintillator the following example is presented. A borosilicate glass body about seven inches square and 4 mm. thick was formed, heat treated, and acid leached in accordance with the procedure of the earlier mentioned Hood et al. patent. The porous body thus produced was completely impregnated by immersion in a cerium salt solution for about 10 minutes. The solution contained 3 grams of cerous nitrate to 50 cc. $1N.HNO_3$. The impregnated glass was air dried and then heated in air to 900° C. It was then exposed to an atmosphere of flowing oxygen while being heated to 1230° C. in an hour and held at that temperature for 15 minutes. This consolidated the glass into a non-porous body composed essentially of 96% $SiO_2$, 3% $B_2O_3$, 0.4% $R_2O_3+RO_2$ (chiefly $Al_2O_3$), traces of $Na_2O$ and $As_2O_3$ and about 0.4% cerium oxide. This glass sample, when tested in the manner earlier described had a scintillation count of about 112,000 per minute. As previously noted, the count on this scintillator was increased to about 198,000 by heating for 30 minutes at 1400° C. after consilidation. In the absence of cerium and with ordinary detection equipment, such a consolidated glass would show a count on the order of a few hundreds per minute, although actually many more pulses too weak for detection might be produced.

What is claimed is:

1. A scintillation counter comprising a cerium oxide containing glass scintillator, capable of emitting scintillations in response to high energy radiation, and a photomultiplier to convert such scintillations into electrical pulses.

2. A counter in accordance with claim 1 in which the scintillator is composed of a silicate type glass.

3. A counter in accordance with claim 1 in which the scintillator is composed of a 96% silica glass.

4. As a new article of manufacture a scintillator consisting of a silica base glass having cerium oxide incorporated therein.

5. A scintillator in accordance with claim 4, and formed from a fused silicate type glass.

6. A scintillator in accordance with claim 4 and formed from a 96% silica glass.

7. A scintillator consisting of a silica base glass containing up to 3% cerium oxide in an intermediate state of oxidation.

References Cited in the file of this patent

UNITED STATES PATENTS

| | | |
|---|---|---|
| 2,219,332 | Pirani | Oct. 29, 1940 |
| 2,321,987 | Brown | June 15, 1943 |
| 2,752,506 | Fitzgerald et al. | June 26, 1956 |
| 2,821,633 | Friedman | Jan. 28, 1958 |
| 2,829,062 | Bennett et al. | Apr. 1, 1958 |
| 2,846,325 | Bennett et al. | Aug. 5, 1958 |